United States Patent
Dubois et al.

(10) Patent No.: US 6,595,285 B2
(45) Date of Patent: Jul. 22, 2003

(54) METHOD AND DEVICE FOR EMITTING RADIAL SEISMIC WAVES IN A MATERIAL MEDIUM BY ELECTROMAGNETIC INDUCTION

(75) Inventors: Jean-Claude Dubois, Lapleau (FR); Patrick Meynier, Chatou (FR)

(73) Assignee: Institut Francais du Petrole, Rueil-Malmaison cedex (FR)

( * ) Notice: Subject to any disclaimer, the term of this patent is extended or adjusted under 35 U.S.C. 154(b) by 76 days.

(21) Appl. No.: 09/828,966

(22) Filed: Apr. 10, 2001

(65) Prior Publication Data

US 2001/0028602 A1 Oct. 11, 2001

(30) Foreign Application Priority Data

Apr. 10, 2000 (FR) .............................. 00 04597

(51) Int. Cl.$^7$ .......................... G01V 1/053; E21B 47/14
(52) U.S. Cl. ................. 166/249; 166/66.5; 367/14; 181/106; 324/346
(58) Field of Search .............. 181/108, 106; 367/140, 14; 166/66.5, 250.16, 249, 209; 324/345, 346, 325, 368; 175/1

(56) References Cited

U.S. PATENT DOCUMENTS

| | | | | |
|---|---|---|---|---|
| 3,258,741 A | * | 6/1966 | Clark ........................ 181/113 |
| 3,334,328 A | * | 8/1967 | Burg et al. ................. 181/5 |
| 3,341,811 A | * | 9/1967 | Piety ........................ 367/140 |
| 4,383,591 A | * | 5/1983 | Ogura ....................... 181/106 |
| 4,541,081 A | * | 9/1985 | Smith ........................ 310/26 |
| 4,796,724 A | * | 1/1989 | Bohn et al. ................ 181/106 |
| 4,922,472 A | * | 5/1990 | Cole et al. ................. 181/114 |
| 5,852,262 A | * | 12/1998 | Gill et al. .................. 181/102 |

* cited by examiner

*Primary Examiner*—David Bagnell
*Assistant Examiner*—Daniel P Stephenson
(74) *Attorney, Agent, or Firm*—Antonelli, Terry, Stout & Kraus, LLP

(57) ABSTRACT

A method and device for emitting radial seismic waves in a material medium by electromagnetic induction, used notably for generating seismic waves in cased or uncased wells or in a water mass is disclosed. Emission of radial waves is essentially obtained by radially expanding a metal tube (1) under the effect of a magnetic pressure generated by electromagnetic induction with elastic waves being created in the medium under the effect of this expansion. The magnetic pressure is obtained by connecting a coil (2) in line with the tube to a current generator (3). The winding pitch of coil (2) can be constant or variable. Tube (1) can for example be added into a well or hole or it can be a tube portion of a cased well.

60 Claims, 4 Drawing Sheets

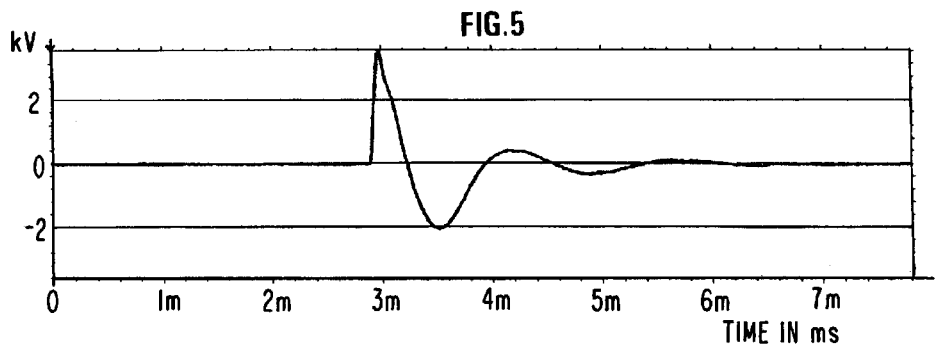
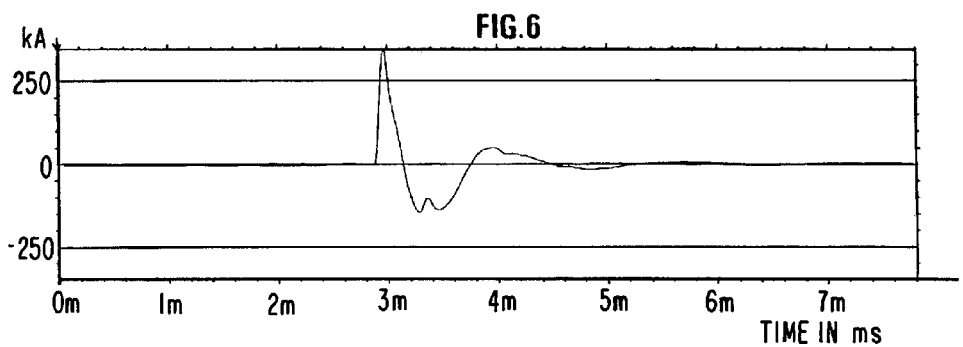
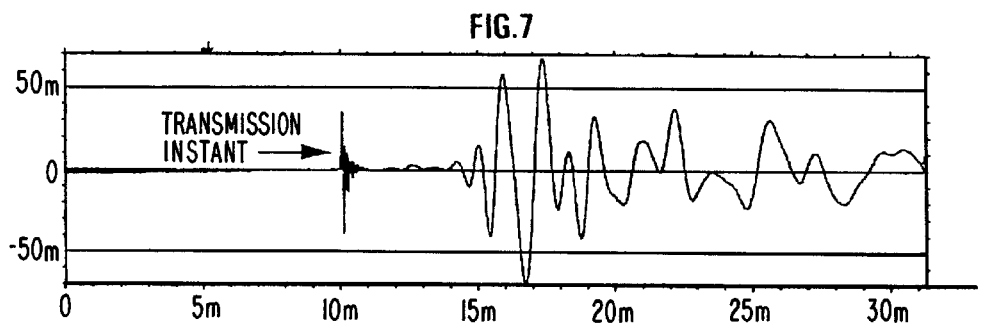
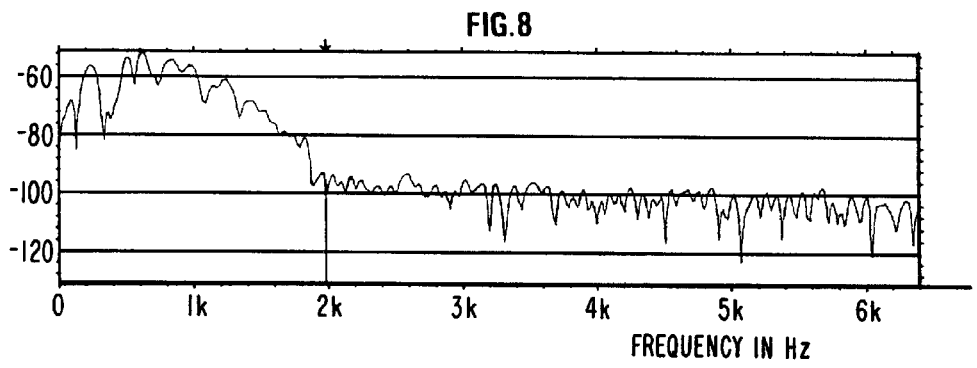

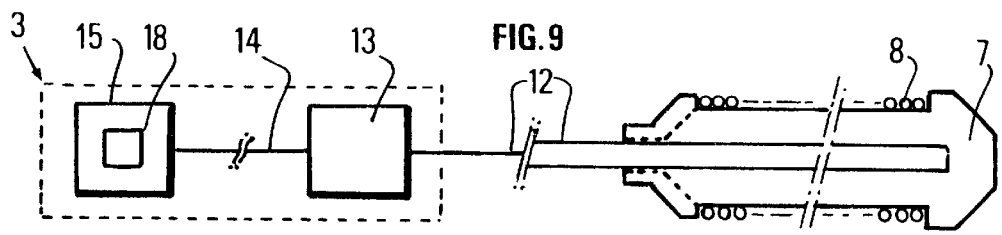
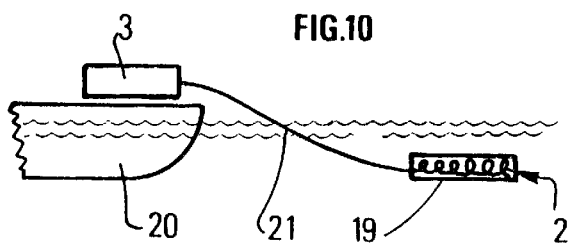
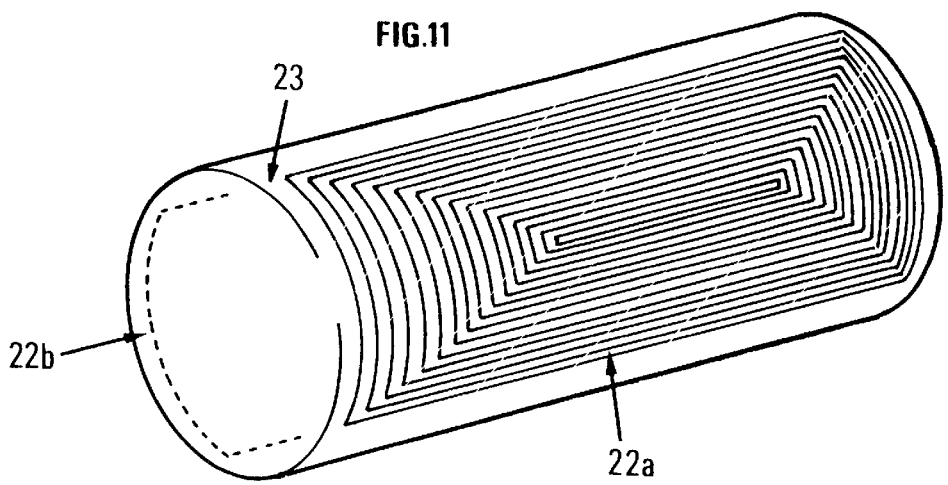
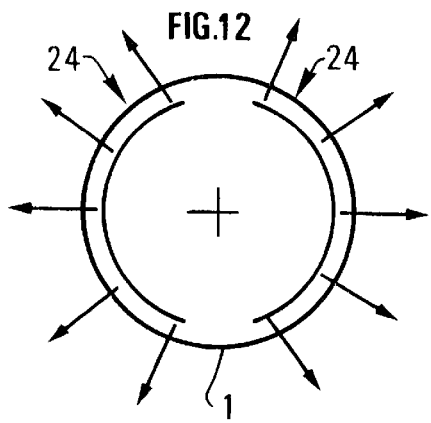

METHOD AND DEVICE FOR EMITTING RADIAL SEISMIC WAVES IN A MATERIAL MEDIUM BY ELECTROMAGNETIC INDUCTION

BACKGROUND OF THE INVENTION

1. Field of the Invention

The present invention relates to a method and to a device for emitting radial seismic waves in a material medium such as the subsoil, by electromagnetic induction, used notably for generating seismic waves in cased wells or in a water body.

2. Description of the Prior Art

There are different types of seismic sources suited to emit in wells. They involve:

- explosions: a point or an elongated charge or detonating cord helically wound on a rigid spindle,
- electric sparks (a breakdown between electrodes in water or wire explosion under the effect of an electric discharge, etc.),
- vertical mechanical shock of a mass falling or thrown onto an anvil secured to a packer, which produces a vertical shear on the well wall mainly generating S waves,
- or a horizontal shock, in a radial direction, of a mass radially driven by hydraulic or electromagnetic device and that strikes the wall of the well at one point.

Controlled vibrational sources of piezoelectric or magnetostrictive type, coupled (or not) with the well wall, which emit a single frequency or signals that are coded or frequency-modulated by a ramp, are also used to create seismic waves in wells.

These sources can be used in a cased or an uncased well. In the case of cased wells, their efficiency is affected by the stiffness of the casing which limits the stress applied to the surrounding medium.

SUMMARY OF THE INVENTION

The device according to the invention uses a well-known physical principle, i.e. the motive action provided by an impulsive magnetic field already used in other applications, for example:

- the making of marine acoustic sources where the repulsion of two metal disks surrounding a flat coil fed by an electric shock generator (plane structure) is used,
- the making of electromagnetic shutters for electromagnetic radiations (optical or X-ray spectrum) consisting of a thin metal tube placed in line with and inside a coil whose impulsive magnetic field causes collapse,
- plasma acceleration, etc.

The device according to the invention finds applications notably for operations of seismic prospecting or monitoring of the subsoil wherein seismic wave emission is conventionally triggered and the waves reflected by the formation discontinuities are recorded by means of seismic receivers (geophones, hydrophones) in order to form seismograms. The device can be used for example to generate seismic waves in cased or uncased wells or in a water body.

The method according to the invention allows generation of radial elastic waves in a material medium. The method radially expands at least part of the wall of a metal tube in contact with the medium under the effect of a magnetic pressure generated by electromagnetic induction, with emission in the medium of the elastic waves created in the medium under the effect of this expansion.

The device according to the invention allows generation of radial elastic waves in a material medium. It essentially comprises a metal tube in contact with the medium and a motive device arranged inside the tube to exert either an isotropic magnetic pressure on all of the wall of the tube, thus causing a radial expansion of the wall of the metal tube, or an anisotropic magnetic pressure on the wall of the tube, causing an (anisotropic) radial expansion of only part of the wall of the metal tube.

According to a first embodiment, the motive device comprises a coil formed for example on an insulating spindle with a constant or a variable winding pitch that can increase from the central part to the ends of the coil so as to increase the dipolar radiation along the axis of the coil, or decrease from the central part to the ends of the coil so as to modify the acoustic radiation diagram as a function of the frequency.

According to another embodiment, the motive device comprises at least one coil formed on a cylindrical wall portion of a spindle, which creates an anisotropic magnetic pressure exerted on at least a cylindrical portion of the tube.

The coil can comprise a core of high magnetic permeability and of low coercive force.

The electrical generator can be a shock generator suited to provide current pulses or a generator suited to provide current pulse trains so as to generate vibrations in the medium. This pulse train generator can for example be controlled by a control element suited to generate a variable-frequency control signal.

The tube is for example a well casing tube mechanically coupled with the formations surrounding the well and the motive device can comprise a sonde connected to an electric excitation generator, the sonde moving in the well up to the triggering point.

According to an embodiment, the electrical generator comprises for example a battery comprising capacitors arranged in an enclosure in the vicinity of the sonde, supplied by an electrical source remote from the enclosure.

According to an embodiment, the tube is the lateral wall of a sealed enclosure, the motive device comprising a coil placed in the enclosure, the electrical generator being at least partly outside the enclosure.

The device can be used for example within the scope of operations of onshore seismic exploration or monitoring of an underground reservoir. Waves are emitted in the formations surrounding the well by triggering an electrical generator. Waves reflected by the underground zone discontinuities are received and recorded. The records are processed so as to form seismograms of the zone.

The device can also be used for example within the scope of operations of marine seismic exploration or monitoring of an underground zone below a water body, with immersion of an enclosure from a vehicle or a stationary installation. Waves in the water body are emitted by triggering electrical generator. Waves reflected by the underground zone discontinuities are received and recorded. The records are processed to form seismograms of the zone.

BRIEF DESCRIPTION OF THE DRAWINGS

Other features and advantages of the method and of the device according to the invention will be clear from reading the description hereafter of non limitative impulsive source examples, with reference to the accompanying drawings wherein:

FIG. 5 shows an example of variation as a function of time of the voltage applied to the primary coil of the pulse generator, FIG. 6 shows an example of variation as a function of time of the corresponding electric current circulating in the tube, FIG. 7 shows an example of a seismic signal received by a wave pickup such as a geophone at a given distance from the seismic source, FIG. 8 shows the frequency spectrum of the seismic signal of FIG. 7, FIG. 9 diagrammatically shows a variant of the embodiment of FIG. 4, FIG. 10 diagrammatically shows an application of the device for generating acoustic waves in water, FIG. 11 shows an embodiment using flat coils allowing to create an anisotropic dipolar source, and FIG. 12 illustrates the effect on the tube of the current applied to the coils of FIG. 11.

DETAILED DESCRIPTION OF THE PREFERRED EMBODIMENTS

In order to generate seismic waves in a material medium, a variation of the cross-section of a metal tube 1 in contact with the medium is caused as mentioned above. In the example described herein, a radial expansion of tube 1 occurs under the effect of a magnetic pressure generated by electromagnetic induction.

Figure 1:
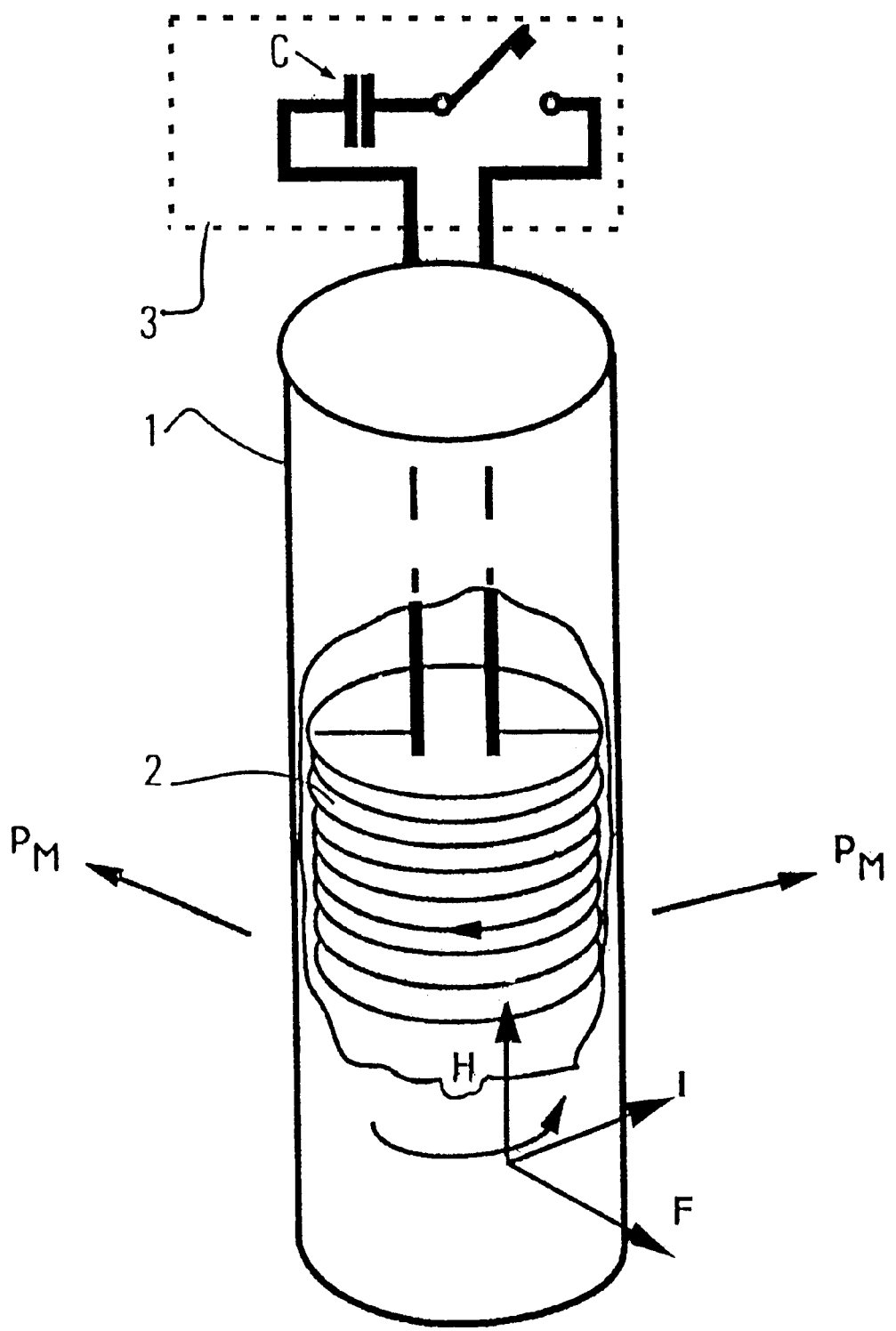
FIG. 1 diagrammatically shows the principle of the device with an electromagnetic current pulse generator for creating an expansion in a tube.

This magnetic pressure is created (FIG. 1) by means of a coaxial coil 2 with N turns placed inside tube 1, to which an intense electric current pulse $I_1$ produced by an electrical shock generator 3 is applied, which generates an axial magnetic field H. An induced current $I_2$, which travels metal tube 1 in a circle, is created by induction. Axial magnetic field H produces on any element of tube 1 through which current $I_2$ runs an orthogonal electromagnetic force F headed radially. The tube behaves locally like a single turn closed on itself.

Figure 2:
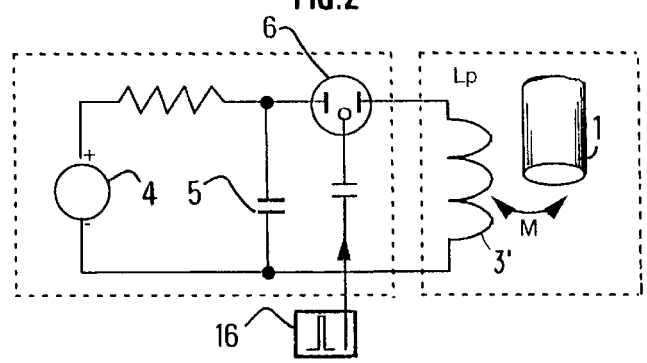
FIG. 2 shows the simplified equivalent circuit of the current generator, FIG. 3 diagrammatically shows the distribution of the mechanical stresses.

The coil/casing system behaves like an air transformer (FIG. 2) with a primary winding LP (coil 3') and a secondary winding LS (tube 1). In order that the induced currente $$\left(e = \frac{d\Phi}{dt}\right)$$

is maximum, a fast flux variation is required. The electrical discharge provided can be provided by the discharge of capacitors C.

Electrical shock generator 3 comprises for example (FIG. 2) a continuous supply 4, a battery 5 comprising capacitors and a spark gap 6 ensuring current change in coil 2.

Figure 3:
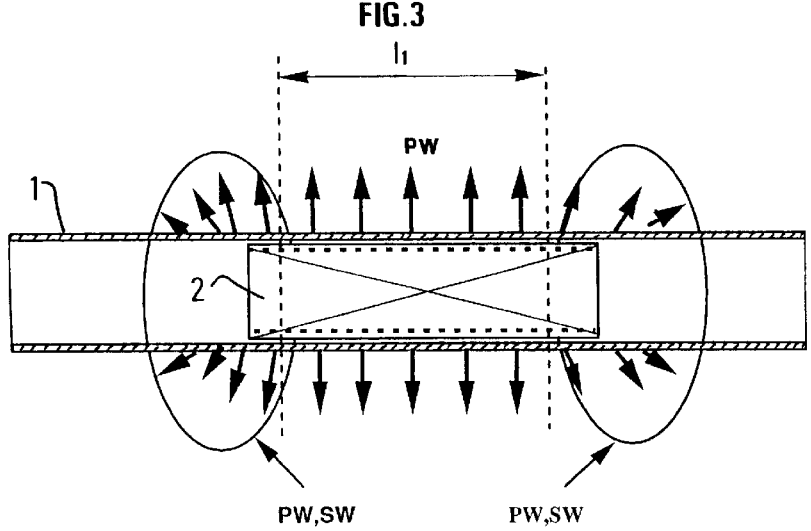

Over a large part of the coil length, the waves generated are compression waves PW (FIG. 3). In the vicinity of the opposite terminal parts of coil 2, the magnetic field created is dipolar and the waves generated are also S type waves.

In order that this process develops with an acceptable efficiency, the excitation coil/casing magnetic coupling has to be close to metal tube 1, which implies that the coil is long in relation to its diameter D and the diameter is close to the inside diameter of the tube or casing. A coil of length L such that D/L<0.2 is for example selected.

The flux variation also has to be very fast for the induction in the secondary circuit to be as intense as possible and the surface of the tube or casing subjected to the radial stress must be sufficient to ensure an elastic radiation in the desired frequency range.

The shock generator is designed according to the equivalent circuit of the source. The electrical circuit of shock generator 3 includes a self-inducting coil Lp and a resistor. In order to keep the impulsive mode and to avoid an oscillating discharge whose polarity reversals are harmful to the capacitors of the electric shock generator, the system has to be set to critical damping.

The equivalent electrical circuit of the seismic source is a transformer whose secondary (the tube) is closed on itself. The impedance at the primary of the transformer is that of the secondary multiplied by the square of the turns ratio. The turns ratio being N, the impedance at the primary is $Z_p = N^2 \cdot Z_s$. Determination of N depends on the characteristics of the tube used and on the equivalent capacity of the discharge circuit.

The dominant frequency depends on the electric resonance of the equivalent circuit. For a given energy and central frequency, the capacity of the electric shock generator and the charging voltage determine the value of the potential energy of the system. The self-inducting coil of the source itself must be dimensioned (length, number of turns, etc.) to obtain the desired mean frequency.

Tube 1 can be, for example, a casing and coaxial coil 2 positioned inside the tube at the depth where it is desired to generate radial magnetic forces.

Figure 4:
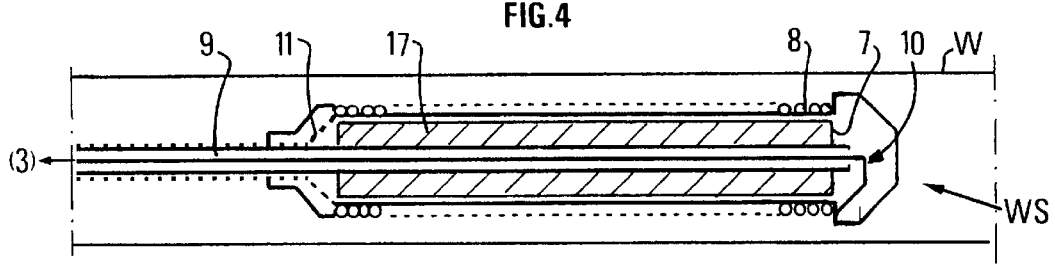
FIG. 4 shows a practical embodiment example of the pulse generator.

The well seismic source illustrated in FIG. 4 comprises a rigid spindle 7 made of an insulating material on which a solenoid 8 is wound and an electric cable 9 connecting coil 8 to shock generator 3. Electrical cable 9 is for example a coaxial cable, the opposite ends of coil 8 being respectively connected to central conductor 10 and to shield 11. The electrical cable connecting coil 8 to shock generator 3 must be as short as possible to prevent losses. If the seismic source is intended for seismic prospecting operations in relatively deep wells W (typically of the order of 200 m or more), shock generator 3 is divided into two parts. The seismic source is suspended by a cable portion 12 from a container 13 where the battery 5 comprising capacitors and spark gap 6 are placed. Another electric cable 14 connects container 13 to an assembly 15 placed for example at the surface and comprising electric source 4 and a trigger circuit 16 (see FIG. 2).

Triggering of the electric shock is precise (uncertainty of the order of 1 micro-second) and the quasi-absence of mechanical motion, except for the expansion of the tube, allows excellent synchronization and good repetitiveness of the signature of the signal emitted.

Embodiment Example

A coil was made for a 7-inch casing and a shock generator with a capacitive storage of 1 kJ associated therewith (C=80 $\mu$F, V=5 kV). The coil, which was 145 mm in mean diameter (150 mm in overall diameter) comprised 200 turns in a single layer over a length of 1 m. The resistance of the loop consisting of 1 m of the casing was of the order of $10^{-4} \Omega$.

FIGS. 5 and 6 respectively show the shape of the signal at the output of the electric shock generator and that of the current circulating in the tube or casing. The pulse has a waveform close to the one desired at critical damping. The current peak is of the order of 300 kA, which gives a pressure peak of the order of 60 kPa.

The emitted seismic signal measured by a geophone in a well 5 m above the source is shown in FIG. 7. Its spectrum is in accordance with that of the electric pulse with a maximum amplitude in the vicinity of 600 Hz (FIG. 8).

Variants

In order to improve the efficiency of the source, the axial magnetic field can be increased by placing a ferromagnetic core 17 (see FIG. 4) in the excitation coil so as to improve the mutual coupling of the solenoid with the tube or the casing element.

Because of the operating mode, it is essential that this core 17 exhibits low losses (hysteresis, convection currents) and that its mechanical rigidity is high to ensure geometrical stability of the coil. A core 17 made of ceramic for example (ferromagnetic ferrite with a low coercive force) meets such requirements. It lends itself to the winding of the solenoid embedded in the surface of the spindle (made of ceramic for example) for a better dimensional stability of the coil (higher resistance to the magnetic forces of which it is itself the seat).

Other Variants

It is also possible to make a variable-pitch winding (2 or 8) to weight the magnetic pressure along the tube in order to regulate the acoustic radiation diagram. The pitch can for example decrease symmetrically from the middle of coil 2 to modify the acoustic radiation diagram as a function of the frequency, or increase symmetrically with a narrower pitch in the vicinity of the ends so as to increase the dipolar radiation along the axis of the coil.

According to the embodiment of FIGS. 11, 12, the motive device comprises two curved flats coils or pancake coils 22A, 22B formed on two opposite portions of the lateral wall of a spindle 23 (by embedding on grooved wall portions for example). With this layout, application of electric currents to these coils creates radial forces on two opposite wall portions 24 of tube 1. A dipolar anisotropic source is thus created.

For applications in a cased well, tube 1 is the casing of the well itself. In other cases where the device is placed in an uncased well or in a cavity formed in the medium, it comprises an external tube element or a cylindrical metal shell that contains the electric excitation circuits.

Examples where the material medium in contact with tube 1 is a solid medium have been described so far. The device could also be used for emitting radial elastic waves in water (FIG. 10) without departing from the scope of the invention. The spindle with its outer coil 8, 21 as described in FIG. 4 or 12 is placed in a tube 19 closed at both ends and electrically insulated from the outside medium. The device can be fastened to the hull of a ship or to a floating structure 20, or towed in immersion by a towline 21 which can be, for example, the coaxial feeding cable such as cable 9.

A control mode producing seismic impulsive signals has also been described. It is however clear that, by feeding coil (2, 8) by means of longer periodic electric signals, vibrations can also be generated in the medium surrounding the source. A control element 18 (see FIG. 9) which generates variable-frequency control signals and obtains increasing or decreasing frequency vibrations, with a linear or logarithmic ramp, or a succession of individual frequencies, is used. In such a case, the intensity of the electric signals raises the low frequency level if needed.

The device can be used for example for seismic prospecting operations as well as for seismic monitoring operations in a hydrocarbon reservoir during production or development of an underground fluid storage reservoir. It is particularly well-suited notably for seismic crosshole tomography.

The seismic trace processing operations conventionally comprise correlating the seismic signals reflected by the discontinuities of the medium explored by the control pilot signal of the vibrator. The radial stress exerted on the surrounding medium being always exerted in the same direction here. Whatever the polarity of the magnetic field, either the pilot signal after rectification or the square of the pilot signal is used as the reference signal.

What is claimed is:

1. A method of generating radial seismic waves at any point of at least a portion of a well through a geological formation by electromagnetic induction, wherein an electrically conductive metal tube which is subjected to the electromagnetic induction and which is tightly coupled with the geological formation surrounding the well is installed along the at least a portion of the well and an electromagnetic generator is lowered into the well to a set point in the well to cause directly by the electromagnetic induction in the metal tube a local expansion of the tube to produce emission of the seismic waves into the geological formation.

2. A seismic emission device for generating radial seismic waves at any point of a well through a geological formation by electromagnetic induction, wherein, the well is cased over part of a length thereof by an electrically conductive metal tube tightly coupled with the geological formation, the seismic emission device comprising a well tool, with the well tool moving along the cased part of the length of the well including an elongated spindle on which are wound coils and an electrical current source which generates current in the coils causes by the electromagnetic induction in the metal tube an emission of seismic waves into the geological formation.

3. A seismic emission device as claimed in claim 2, wherein the coils are formed on an insulating spindle with a constant winding pitch.

4. A seismic emission device as claimed in claim 3, wherein the coils comprise a core of high magnetic permeability and low coercive strength.

5. A seismic emission device as claimed in claim 3, wherein the electrical current source comprises a capacitor disposed in an enclosure in a vicinity of a sonde which is driven by a seismic emission device displaced from the enclosure.

6. A seismic emission device as claimed in claim 3, wherein the electrical current source supplies current pulse trains which generate vibrations in the medium.

7. A method of using the seismic emission device as claimed in claim 3 for onshore seismic exploration or monitoring operations in an underground zone in which an emission of seismic waves into the geological formation surrounding the well is produced by triggering the electrical current source, receiving and recording reflected waves produced by discontinuities of underground zone of the geological formation and processing the recording of the reflected waves to form a seismogram of the underground zone.

8. A seismic emission device as claimed in claim 2, wherein the coils are formed on an insulating spindle with an increasing winding pitch from a central part of the spindle toward ends of the spindle to increase an emission of a dipolar magnetic field along axis of the coil toward the ends of the spindle.

9. A seismic emission device as claimed in claim 8, wherein the coils comprise a core of high magnetic permeability and low coercive strength.

10. A seismic emission device as claimed in claim 8, wherein the electrical current source comprises a capacitor disposed in an enclosure in a vicinity of a sonde which is driven by a seismic emission device displaced from the enclosure.

11. A seismic emission device as claimed in claim 8, wherein the electrical current source supplies current pulse trains which generate vibrations in the medium.

12. A seismic emission device as claimed in claim 8, wherein the electrical current source supplies current pulse trains which generate vibrations in the medium.

13. A method of using the seismic emission device as claimed in claim 8 for onshore seismic exploration or monitoring operations in an underground zone in which an emission of seismic waves into the geological formation surrounding the well is produced by triggering the electrical current source, receiving and recording reflected waves produced by discontinuities of underground zone of the geological formation and processing the recording of the reflected waves to form a seismogram of the underground zone.

14. A seismic emission device as claimed in claim 2, wherein the coils are formed on an insulating spindle with a decreasing winding pitch from the central part of the spindle toward ends of the spindle which modifies an emission of a magnetic field as a function of the frequency of current variation in the coils.

15. A seismic emission device as claimed in claim 14, wherein the coils comprise a core of high magnetic permeability and low coercive strength.

16. A seismic emission device as claimed in claim 14, wherein the electrical current source comprises a capacitor disposed in an enclosure in a vicinity of a sonde which is driven by a seismic emission device displaced from the enclosure.

17. A method of using the seismic emission device as claimed in claim 14 for onshore seismic exploration or monitoring operations in an underground zone in which an emission of seismic waves into the geological formation surrounding the well is produced by triggering the electrical current source, receiving and recording reflected waves produced by discontinuities of underground zone of the geological formation and processing the recording of the reflected waves to form a seismogram of the underground zone.

18. A seismic emission device as claimed in claim 2, wherein the coils comprise at least one coil formed on a cylindrical wall portion of a spindle, which creates a magnetic pressure exerted on at least a cylindrical portion of tube.

19. A seismic emission device as claimed in claim 18, wherein the coils comprise a core of high magnetic permeability and low coercive strength.

20. A seismic emission device as claimed in claim 2, wherein the coils comprise a core of high magnetic permeability and low coercive strength.

21. A seismic emission device as claimed in claim 20, wherein the electrical current source comprises a capacitor disposed in an enclosure in a vicinity of a sonde which is driven by a seismic emission device displaced from the enclosure.

22. A seismic emission device as claimed in claim 20, wherein the electrical current source supplies current pulse trains which generate vibrations in the medium.

23. A method of using the seismic emission device as claimed in claim 20 for onshore seismic exploration or monitoring operations in an underground zone in which an emission of seismic waves into the geological formation surrounding the well is produced by triggering the electrical current source, receiving and recording reflected waves produced by discontinuities of underground zone of the geological formation and processing the recording of the reflected waves to form a seismogram of the underground zone.

24. A seismic emission device as claimed in claim 2, wherein the electrical current source comprises a capacitor disposed in an enclosure in a vicinity of a sonde which is driven by a seismic emission device displaced from the enclosure.

25. A method of using the seismic emission device as claimed in claim 24 for onshore seismic exploration or monitoring operations in an underground zone in which an emission of seismic waves into the geological formation surrounding the well is produced by triggering the electrical current source, receiving and recording reflected waves produced by discontinuities of underground zone of the geological formation and processing the recording of the reflected waves to form a seismogram of the underground zone.

26. A method of using the seismic emission device as claimed in claim 2 for onshore seismic exploration or monitoring operations in an underground zone in which an emission of seismic waves into the geological formation surrounding the well is produced by triggering the electrical current source, receiving and recording reflected waves produced by discontinuities of underground zone of the geological formation and processing the recording of the reflected waves to form a seismogram of the underground zone.

27. A seismic device for generating radial seismic waves at any point of a zone of a well through a geological formation by electromagnetic induction, comprising an electrically conductive metal tube tightly coupled with the geological formation surrounding a total length of the zone and a well tool, with the well tool moving along the zone, including an elongated spindle on which are wound coils and an electrical current source which generates current in the coils which causes by the electromagnetic induction in the metal tube a local expansion producing emission of seismic waves into the geological formation.

28. A seismic emission device as claimed in claim 27, wherein the coils are formed on an insulating spindle with a constant winding pitch.

29. A seismic emission device as claimed in claim 28, wherein the coils comprise a core of high magnetic permeability and low coercive strength.

30. A method of using the seismic emission device as claimed in claim 28 for onshore seismic exploration or monitoring operations in an underground zone in which an emission of seismic waves into the geological formation surrounding the well is produced by triggering the electrical current source, receiving and recording reflected waves produced by discontinuities of underground zone of the geological formation and processing the recording of the reflected waves to form a seismogram of the underground zone.

31. A seismic emission device as claimed in claim 27, wherein the coils are formed on an insulating spindle with an increasing winding pitch from a central part of the spindle toward ends of the spindle to increase an emission of a the dipolar magnetic field along axis of the coil toward the ends of the spindle.

32. A seismic emission device as claimed in claim 31, wherein the coils comprise a core of high magnetic permeability and low coercive strength.

33. A seismic emission device as claimed in claim 27, wherein the coils are formed on an insulating spindle with a decreasing winding pitch from the central part of the spindle toward ends of the spindle which modifies an emission of magnetic radiation as a function of the frequency of current variation in the coils.

34. A seismic emission device as claimed in claim 33, wherein the coils comprise a core of high magnetic permeability and low coercive strength.

35. A seismic emission device as claimed in claim 27, wherein the coils comprise at least one coil formed on a cylindrical wall portion of a spindle, which creates a magnetic pressure exerted on at least a cylindrical portion of tube.

36. A seismic emission device as claimed in claim 35, wherein the coils comprise a core of high magnetic permeability and low coercive strength.

37. A seismic emission device as claimed in claim 27, wherein the coils comprise a core of high magnetic permeability and low coercive strength.

38. A seismic emission device as claimed in claim 27, wherein the electrical current source comprises a capacitor disposed in an enclosure in a vicinity of a sonde which is driven by a seismic emission device displaced from the enclosure.

39. A seismic emission device as claimed in claim 27, wherein the electrical current source supplies current pulse trains which generate vibrations in the medium.

40. A seismic emission device as claimed in claim 39, wherein the electrical current source generator comprises a control element which generates a variable-frequency control signal.

41. A method of using the seismic emission device as claimed in claim 39 for onshore seismic exploration or monitoring operations in an underground zone in which an emission of seismic waves into the geological formation surrounding the well is produced by triggering the electrical current source, receiving and recording reflected waves produced by discontinuities of underground zone of the geological formation and processing the recording of the reflected waves to form a seismogram of the underground zone.

42. A seismic emission device as claimed in claim 27, wherein the electrical current source supplies current pulse trains which generate vibrations in the medium.

43. A method of using the seismic emission device as claimed in claim 27 for onshore seismic exploration or monitoring operations in an underground zone in which an emission of seismic waves into the geological formation surrounding the well is produced by triggering the electrical current source, receiving and recording reflected waves produced by discontinuities of underground zone of the geological formation and processing the recording of the reflected waves to form a seismogram of the underground zone.

44. A method of generating radial seismic waves successively at different locations along a well in a geological formation caused by electromagnetic induction, the well being provided with a casing comprising
an electrically conductive material which is subjected to the electromagnetic induction and which is coupled with the geologic formation surrounding the well, comprising:
lowering into the well successively at the different locations an electromagnetic generator including coils wound around an elongated member and an electrical current source coupled to the coils which provides current to the coils and at each of the different locations causing the current source to provide current to the coils to cause by the electromagnetic induction in the electrically conductive material a local expansion of the casing producing an emission of the seismic waves into the geological formation.

45. A seismic emission device for generating radial seismic waves at points of a well through a geologic formation caused by electromagnetic induction, wherein, the well is cased over part of a length thereof by an electrically conductive metal tube which is subjected to the electromagnetic induction and which is coupled with the geological formation, the seismic emission device comprising:
a well tool, which moves along the cased part of the well, including an elongated part on which are wound coils and an electrical current source coupled to the coils which provides current to the coils to cause by the electromagnetic induction in the electrically conductive material a local expansion of the casing tube producing an emission of the seismic waves into the geological formation.

46. A seismic emission device as claimed in claim 45, wherein the electrical current source comprises a battery comprising capacitors in an enclosure proximate to a sonde which is driven by an electric seismic emission device remote from the enclosure.

47. A seismic emission device as claimed in claim 45, wherein the electrical current source supplies current pulse trains which generate vibrations in the metal tube.

48. A seismic emission device as claimed in claim 45, wherein the electrical current source comprises a control element which generates a variable-frequency current.

49. A seismic emission device for generating radial seismic waves at points of a zone of a well through a geologic formation caused by electromagnetic induction, wherein, the well is cased over a part of the length thereof by an electrically conductive metal tube coupled with the geological formation, the seismic emission device comprising a well tool, which moves along the cased part of the well, including an elongated part and coils wound on the elongated part with an increasing winding pitch from a central part of the elongated part toward ends of the part, which provides a dipolar magnetic field along an axis of the coils toward the ends of the part, and an electrical current source coupled to the coils which provides current to the coils and causes, by the electromagnetic induction in the metal tube, a local expansion of the metal tube producing emission of the seismic waves into the geological formation.

50. A seismic emission device as claimed in claim 49, wherein the electrical current source comprises a battery comprising capacitors in an enclosure proximate to a sonde which is driven by an electrical seismic emission device remote from the enclosure.

51. A seismic emission device as claimed in claim 49, wherein the electrical current source supplies current pulse trains which generate vibrations in the metal tube.

52. A seismic emission device as claim in claim 49, wherein the electrical current source comprises a control element which generates a variable-frequency current.

53. A seismic emission device for generating radial seismic waves at points of a well through a geologic formation caused by electromagnetic induction, wherein, the well is cased over part of the length thereof by an electrically conductive metal tube which is subjected to the electromagnetic induction and which is coupled with the geological formation, the seismic emission device comprising a well tool, which moves along the cased part of the well, including an elongated part and coils wound on the elongated part with a decreasing winding pitch from a central part of the elongated part toward the ends of the part, which provides a magnetic field which varies as a function of the frequency, and an electrical current source coupled to the coils which provides current to the coils and causes by the electromagnetic induction in the metal tube a local expansion of the metal tube producing emission of the seismic waves into the geological formation.

54. A seismic emission device as claimed in claim 53, wherein the electrical current source comprises a battery comprising capacitors in an enclosure proximate to a sonde which is driven by an electrical seismic emission device remote from the enclosure.

55. A seismic emission device as claimed in claim 53, wherein the electrical current source supplies current pulse trains which generate vibrations in the metal tube.

56. A seismic emission device as claimed in claim 53, wherein the electrical current source comprises a control element which generates a variable-frequency current.

57. A seismic emission device for generating radial seismic waves at points of a well through a geologic formation caused by electromagnetic induction, wherein, the well is cased over part of the length thereof by an electrically conductive metal tube coupled with the geological formation, the seismic emission device comprising a well tool, which moves along the cased part of the well, including an elongated cylindrical part and at least one coil formed on a cylindrical wall portion thereof and an electrical current source coupled to the at least one coil which provides current to the at least one coil and causes by the electromagnetic induction in the metal tube a local expansion of at least a cylindrical portion of the casing tube producing emission of the seismic waves into the formation.

58. A seismic emission device as claimed in claim 57, wherein the electrical current source comprises a battery comprising capacitors in an enclosure proximate to a sonde which is driven by an electrical seismic emission device remote from the enclosure.

59. A seismic emission device as claimed in claim 57, wherein the electrical current source supplies current pulse trains which generate vibrations in the metal tube.

60. A seismic emission device as claimed in claim 57, wherein the electrical current source comprises a control element which generates a variable-frequency current.

* * * * *